(12) United States Patent
Hamid

(10) Patent No.: US 8,266,350 B2
(45) Date of Patent: Sep. 11, 2012

(54) METHOD AND SYSTEM FOR SUPPORTING PORTABLE DESKTOP

(75) Inventor: Laurence Hamid, Ottawa (CA)

(73) Assignee: Imation Corp., Oakdale, MN (US)

( * ) Notice: Subject to any disclaimer, the term of this patent is extended or adjusted under 35 U.S.C. 154(b) by 155 days.

(21) Appl. No.: 12/570,477

(22) Filed: Sep. 30, 2009

(65) Prior Publication Data

US 2011/0078347 A1 Mar. 31, 2011

(51) Int. Cl.
G06F 3/00 (2006.01)
G06F 13/12 (2006.01)
G06F 13/00 (2006.01)
G06F 7/04 (2006.01)

(52) U.S. Cl. ............... 710/62; 710/14; 710/36; 710/74; 711/100; 711/163; 711/173; 726/2; 726/16

(58) Field of Classification Search ............ 710/1, 8, 710/14, 36, 37, 62, 63, 72, 74; 711/100, 711/117–122, 147, 163, 164, 170, 173; 726/2, 726/16, 17

See application file for complete search history.

(56) References Cited

U.S. PATENT DOCUMENTS

| 6,321,335 | B1 | 11/2001 | Chu |
| 6,718,463 | B1 | 4/2004 | Malik |
| 6,754,817 | B2 | 6/2004 | Khatri et al. |
| 7,293,166 | B2 | 11/2007 | Nguyen et al. |
| 7,363,363 | B2 | 4/2008 | Dal Canto et al. |
| 7,484,089 | B1 | 1/2009 | Kogen et al. |
| 7,555,568 | B2 | 6/2009 | Huang |
| 7,865,573 | B2 | 1/2011 | Tyhurst et al. |
| 7,975,287 | B2 | 7/2011 | Hung |
| 8,024,790 | B2 | 9/2011 | Zhao et al. |
| 8,065,676 | B1 | 11/2011 | Sahai et al. |
| 8,104,088 | B2 | 1/2012 | Khilnani et al. |
| 2002/0087877 | A1 | 7/2002 | Grawrock |
| 2003/0101246 | A1 | 5/2003 | Lahti |
| 2003/0195950 | A1 | 10/2003 | Huang et al. |
| 2003/0216136 | A1 | 11/2003 | McBrearty et al. |
| 2004/0019778 | A1 | 1/2004 | Gere |
| 2004/0095382 | A1 | 5/2004 | Fisher et al. |
| 2004/0103288 | A1 | 5/2004 | Ziv et al. |
| 2005/0193188 | A1 | 9/2005 | Huang |
| 2005/0235045 | A1 | 10/2005 | Narayanaswami et al. |
| 2006/0080540 | A1* | 4/2006 | Arnon et al. ................. 713/182 |
| 2006/0130004 | A1 | 6/2006 | Hughes et al. |
| 2006/0200679 | A1 | 9/2006 | Hawk et al. |
| 2007/0016743 | A1* | 1/2007 | Jevans ........................ 711/164 |
| 2007/0101118 | A1 | 5/2007 | Raghunath et al. |
| 2007/0143837 | A1 | 6/2007 | Azeez et al. |

(Continued)

FOREIGN PATENT DOCUMENTS

GB 2 420 198 A 5/2006

(Continued)

Primary Examiner — Richard B Franklin
(74) Attorney, Agent, or Firm — Kenneth E. Levitt; Dorsey & Whitney LLP

(57) ABSTRACT

A method is disclosed for a portable peripheral memory storage device. The peripheral memory storage device is coupled with a workstation. In a first mode of operation, a portion of the peripheral memory storage device is mounted on the workstation for operation therewith as a storage medium in a first mode of operation. In a second other mode of operation data within the peripheral memory storage device is used to support a personal desktop on the workstation.

47 Claims, 5 Drawing Sheets

U.S. PATENT DOCUMENTS

| | | |
|---|---|---|
| 2007/0300220 A1 | 12/2007 | Seliger et al. |
| 2008/0016005 A1 | 1/2008 | Owen et al. |
| 2008/0022393 A1 | 1/2008 | Waltermann et al. |
| 2008/0052528 A1 | 2/2008 | Poo et al. |
| 2008/0052770 A1 | 2/2008 | Ali et al. |
| 2008/0052776 A1 | 2/2008 | Prabhat et al. |
| 2008/0172555 A1 | 7/2008 | Keenan |
| 2008/0215796 A1 | 9/2008 | Lam et al. |
| 2008/0293450 A1 | 11/2008 | Ryan et al. |
| 2009/0132816 A1 | 5/2009 | Lee |
| 2009/0210794 A1 | 8/2009 | Pendse et al. |
| 2009/0260071 A1 | 10/2009 | Sadovsky et al. |
| 2009/0300710 A1 | 12/2009 | Chai et al. |
| 2009/0319782 A1* | 12/2009 | Lee ................. 713/156 |
| 2010/0036973 A1* | 2/2010 | Mardiks et al. ......... 710/13 |
| 2011/0078428 A1 | 3/2011 | Hamid |
| 2011/0078785 A1 | 3/2011 | Hamid |
| 2011/0078787 A1 | 3/2011 | Hamid |

FOREIGN PATENT DOCUMENTS

| | | |
|---|---|---|
| WO | 2011/038502 | 4/2011 |
| WO | 2011/038503 | 4/2011 |
| WO | 2011/038504 | 4/2011 |
| WO | 2011/038505 | 4/2011 |
| WO | 2011/057409 | 5/2011 |

* cited by examiner

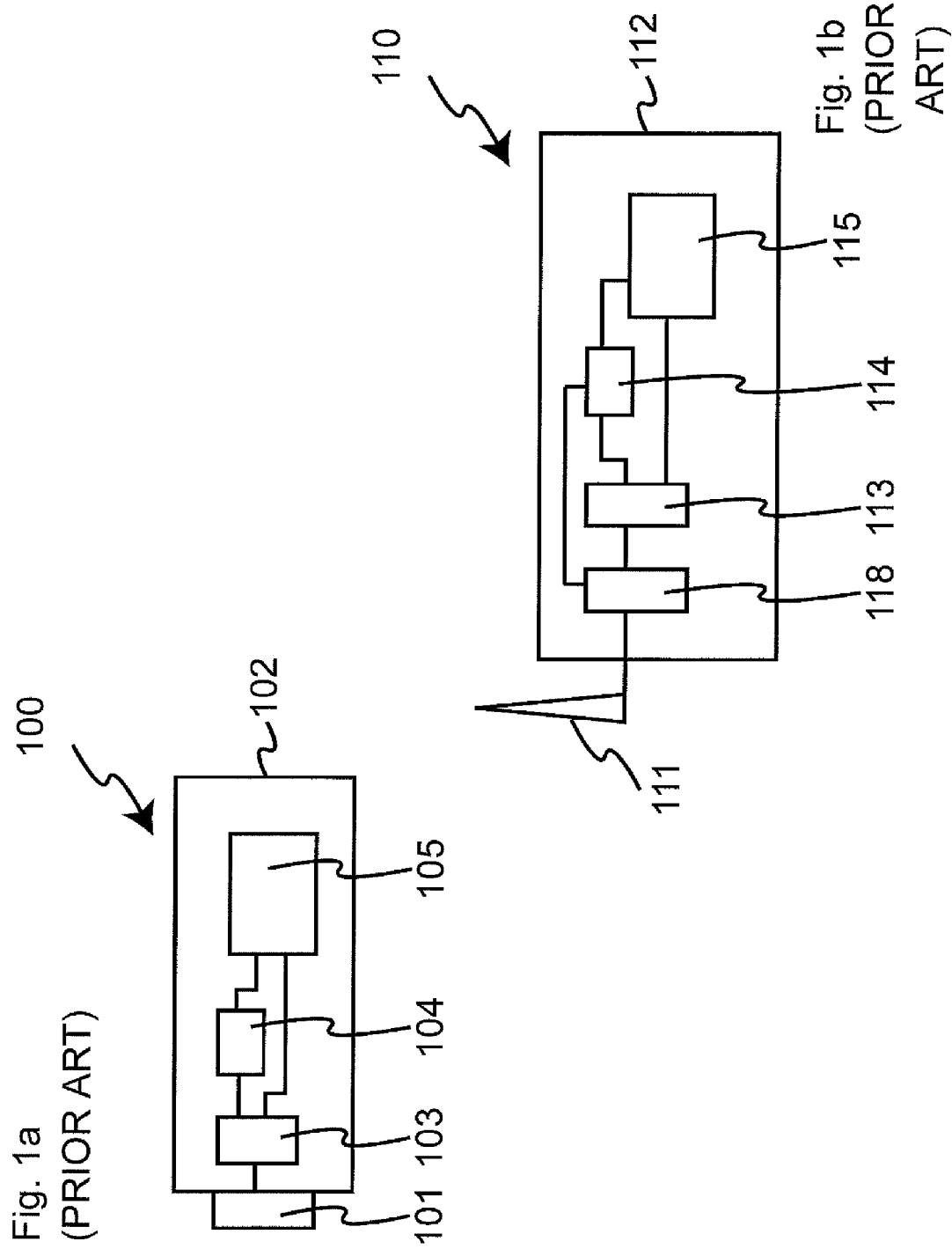

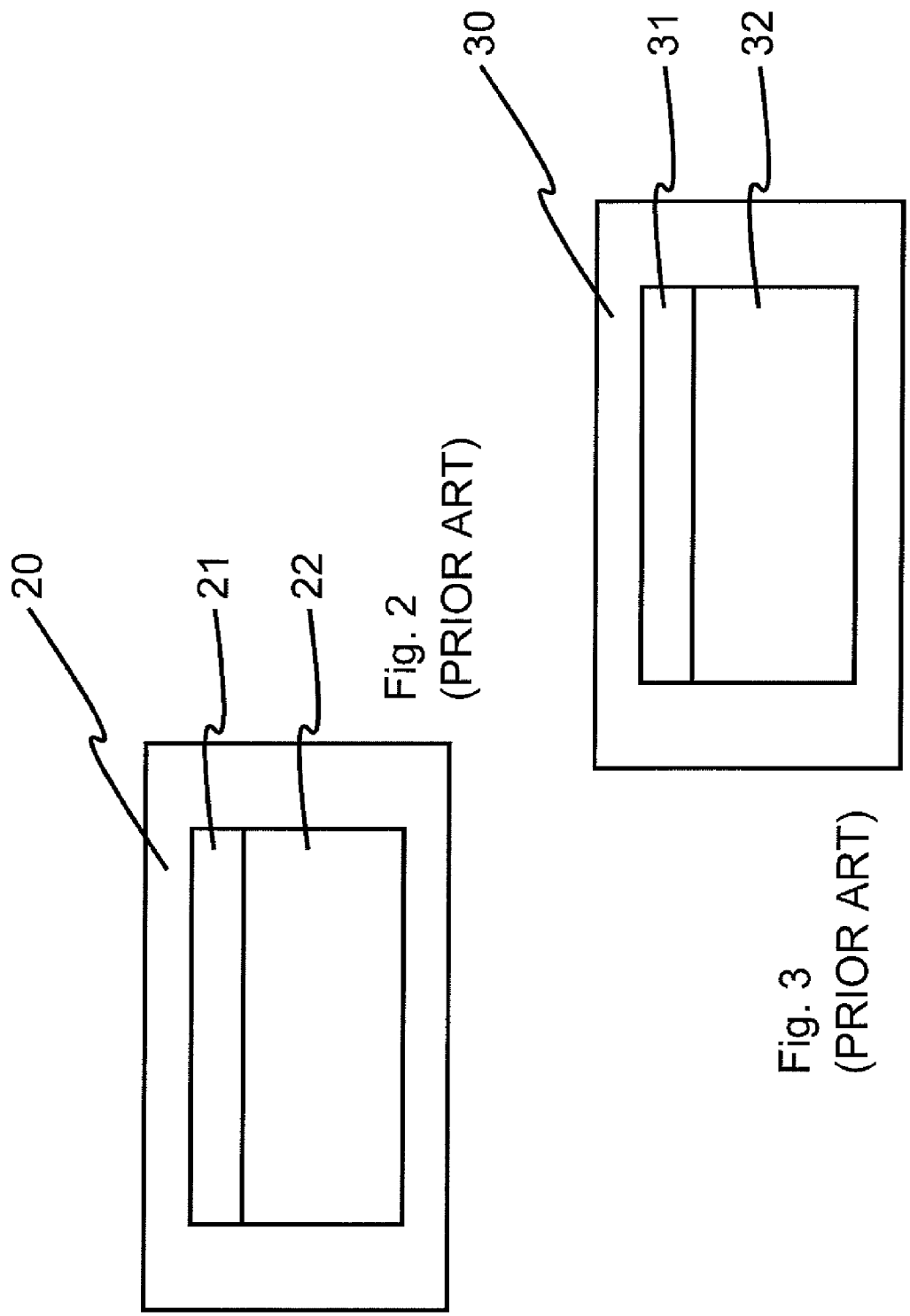

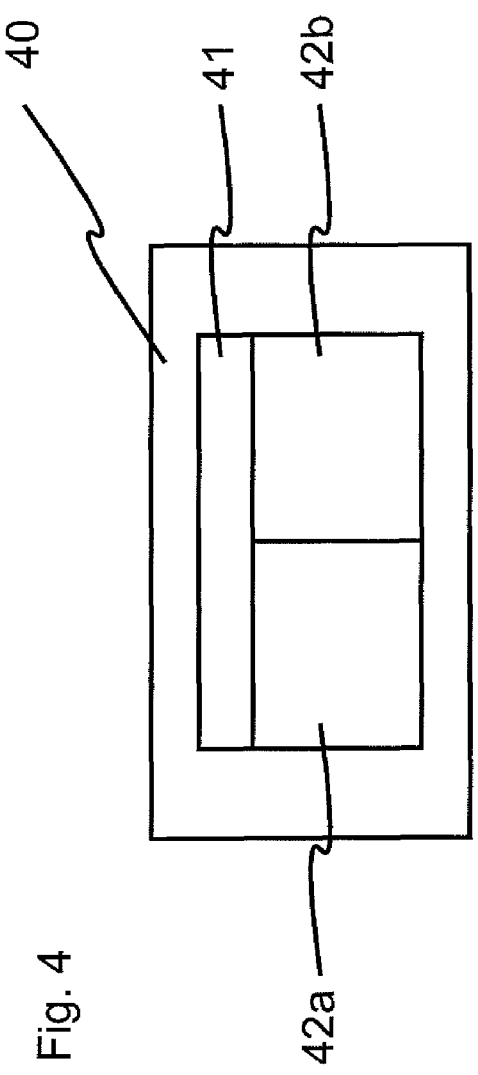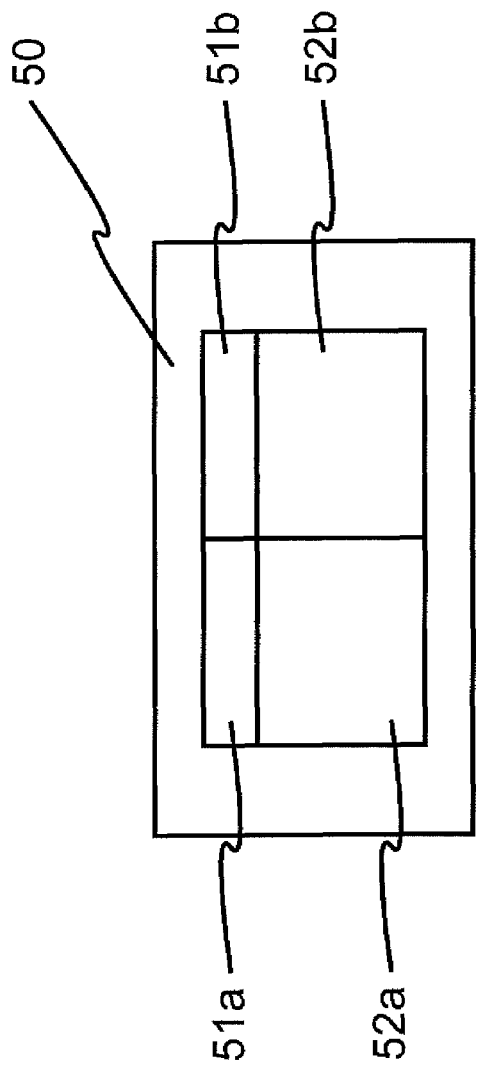

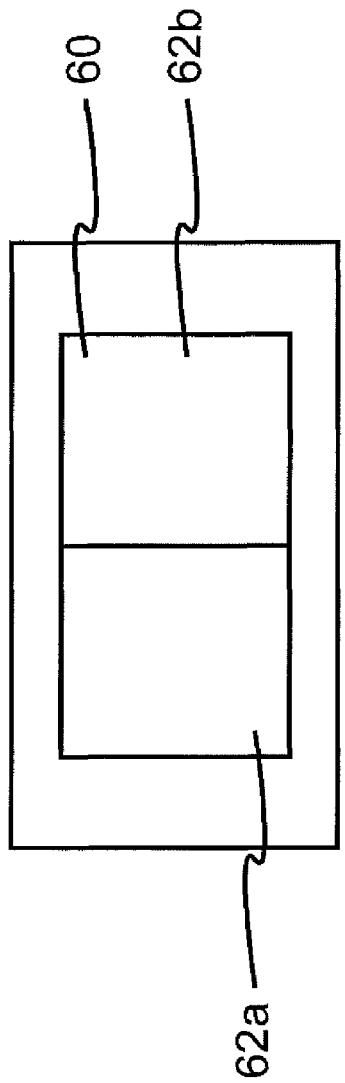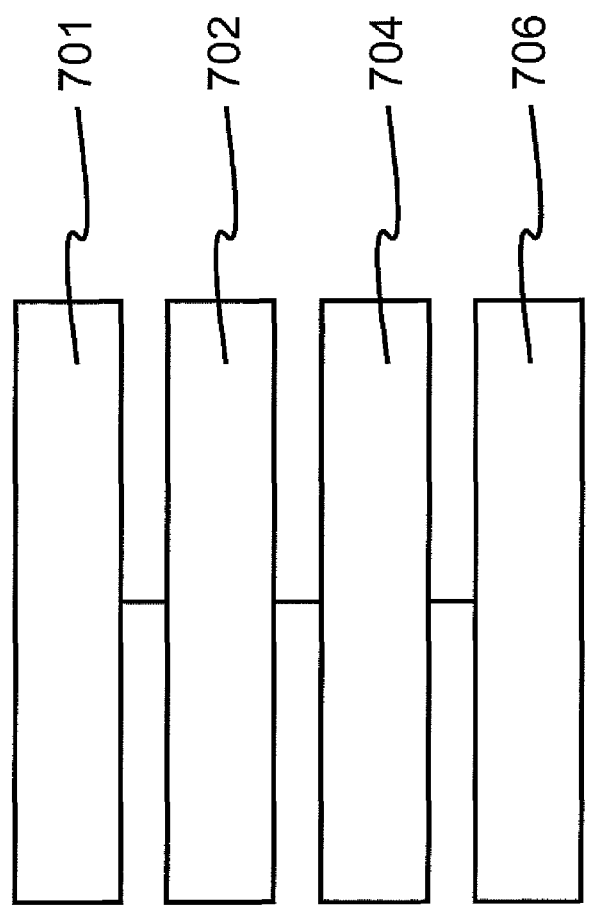

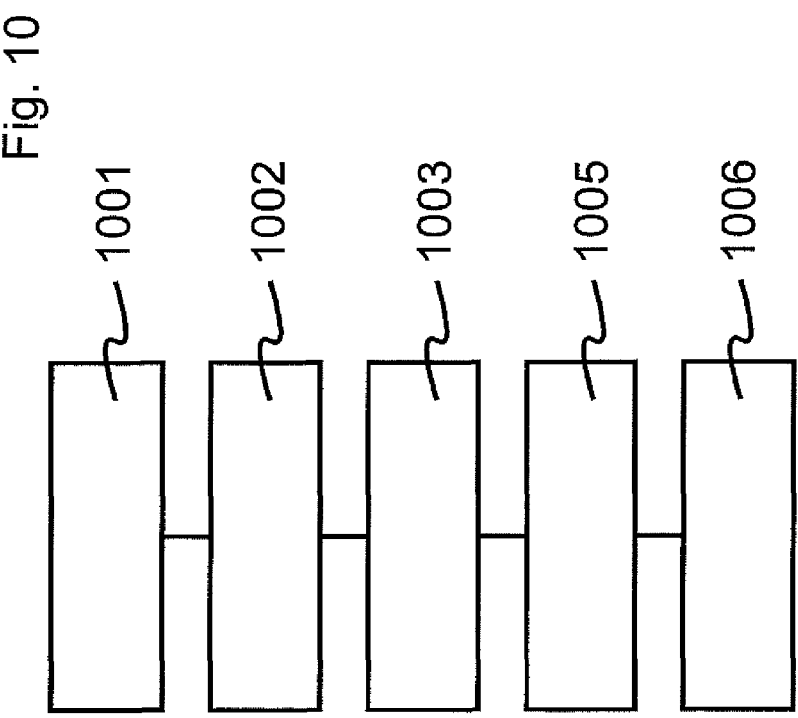
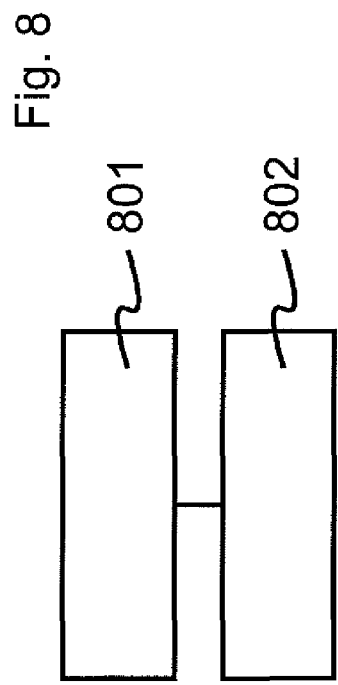

METHOD AND SYSTEM FOR SUPPORTING PORTABLE DESKTOP

FIELD OF THE INVENTION

The present invention generally relates to the field of data processing systems and networks and more particularly to a method and system for using a portable peripheral memory storage device to implement secure and portable personalized desktop functionality.

BACKGROUND

The concept of a portable desktop is well known in the field of data processing systems and data processing networks. A portable desktop generally refers to personal desktop that a user can recreate on any of a number of computers, for example connected to a network. Implied by the term personal desktop is the private data associated with each user including, for example, email, appointments, personal files, and the like. By enabling users to use a greater number of devices without sacrificing the benefits of a familiar and personalized interface, portable desktops have the potential to expand mobility and convenience, greatly. Typically, portable desktops are achieved by storing within a network a personalized file system or directory for each user. In order to enable a user's desktop, files and home directory to be portable, the user's file system or disk is networked within the network. This model, unfortunately, can lead to security lapses in which, for example, a root system administrator snoops and reads a user's personal email, files, etc.

One attempt to address this problem contemplates distributing a personal data device drive to each user. The user's personal directory is stored on the personal drive. When the user connects to the network using a particular computer, the personal drive is inserted into an appropriate slot of the machine. After "hot plugging" the drive into the machine, a network workstation mounts the personal directory on the personal drive and provides a personalized interface to the user. It will be appreciated, however, that the cost and inconvenience associated with requiring users to perform field installs and disk drive configurations every time they wish to access their portable disks makes this solution impractical. Further, the software for each computer supporting the personal desktop application is custom and therefore limits use of the personal desktop and all data associated therewith.

It would be desirable, therefore, to provide a system and method supporting benefits of personalized and portable desktops without sacrificing security and without incurring the cost and inconvenience of the prior art.

SUMMARY OF THE INVENTION

In accordance with the invention there is provided a portable peripheral memory storage device comprising: a housing; a port for interfacing with a workstation; and a memory comprising at least a first portion and a second portion, the first portion comprising portable desktop data and for supporting of portable desktop functionality on a workstation coupled thereto and the second portion for providing portable peripheral memory storage device functionality for a workstation coupled thereto via the port and independent of the portable desktop functionality.

In accordance with another aspect of the invention there is provided a method comprising: coupling a peripheral memory storage device with a workstation; in a first mode of operation, mounting a portion of the peripheral memory storage device on the workstation for operation therewith in a first mode of operation as a storage medium; and, in a second other mode of operation using data within the peripheral memory storage device to support a personal desktop on the workstation.

In accordance with another aspect of the invention, there is provided a portable peripheral memory storage device comprising: a housing; a port for interfacing with a workstation; and a memory comprising at least a first portion for supporting portable desktop functionality on a workstation coupled thereto, the first portion hidden unless the portable peripheral memory storage device is operable for providing the portable desktop functionality.

BRIEF DESCRIPTION OF THE DRAWINGS

Other objects and advantages of the invention will become apparent upon reading the following detailed description and upon reference to the accompanying drawings in which:

FIG. 1a is a simplified block diagram of a portable peripheral memory storage device in the form of a universal serial bus (USB) memory key;

FIG. 1b is a simplified block diagram of a portable peripheral memory storage device in the form of a wireless memory key;

FIG. 2 is a simplified memory diagram for a prior art portable peripheral memory storage device;

FIG. 3 is a simplified memory diagram for a prior art portable peripheral memory storage device supporting virtualisation of a desktop;

FIG. 4 is a simplified memory diagram for a portable peripheral memory storage device according to an embodiment of the invention wherein the device supports a single security process;

FIG. 5 is a simplified memory diagram for a portable peripheral memory storage device according to an embodiment of the invention supporting several different security processes;

FIG. 6 is a simplified memory diagram for a portable peripheral memory storage device according to an embodiment of the invention absent security within the portable peripheral memory storage device FIG. 7 is a simplified flow diagram of a method of providing a virtual desktop;

FIG. 8 is a simplified flow diagram of a method of supporting a portable desktop independent of a removable memory store within a portable peripheral memory device;

FIG. 9 is a simplified flow diagram of a method of supporting a portable desktop supporting limited access to a removable memory store within a portable peripheral memory device; and FIG. 10 is a simplified flow diagram of a method of supporting a portable desktop supporting access to a removable memory store within a portable peripheral memory device

DETAILED DESCRIPTION OF EMBODIMENTS OF THE INVENTION

Referring to FIG. 1a, shown is a prior art portable peripheral memory storage device 100. The device comprises a USB connector 101 and a housing 102. When the USB connector 101 is coupled to a mating connector on a host computer in the form of a personal computer (not shown), data is exchanged between the portable peripheral memory storage device 100 and the host computer. The USB communication circuit 103 communicates with another USB communication circuit within the host computer. The USB communication circuit 103 further communicates with processor 104 in the form of a microcontroller. The processor in turn communicates with static random access memory (static RAM) 105 within the portable peripheral memory storage device 100.

When powered on, the prior art peripheral memory storage device commences interactions with a host computer system from which it draws power. The interactions allow the host computer system to mount the portable peripheral memory storage device 100 for access as a memory storage device by the host computer system. Thus, the portable peripheral memory storage device 100, for example, appears as a storage device listed with other storage devices of the host computer. It is known to then store data on or retrieve data from the portable peripheral memory storage device 100. Removing the portable peripheral memory storage device 100 from the host computer system allows for portability of any of the data stored therein to another host computer either locally or wherever the portable peripheral memory storage device 100 is taken.

Referring to FIG. 1b, shown is a prior art portable peripheral memory storage device 110. The device comprises an antenna 111 and a housing 112. When the portable peripheral memory storage device 110 is wirelessly coupled to a host computer in the form of a personal computer (not shown), data is exchangeable between the portable peripheral memory storage device 110 and the host computer. A transceiver circuit 118 present within the housing 112 converts data into amplified signals for driving the antenna 111. A communication circuit 113 communicates with another communication circuit within the host computer via the wireless communication link formed therebetween. The communication circuit 113 further communicates with processor 114 in the form of a microcontroller. The processor 114 in turn communicates with static random access memory (static RAM) 115 within the portable peripheral memory storage device 110.

Once wirelessly coupled to a host computer, the prior art portable peripheral memory storage device commences interactions with the host computer system. The interactions allow the host computer system to mount the portable peripheral memory storage device 110 for access as a memory storage device by the host computer system. Thus, the portable peripheral memory storage device 110, for example, appears as a storage device listed with other storage devices of the host computer. It is known to then store data on or retrieve data from the portable peripheral memory storage device 110. Moving the portable peripheral memory storage device 110 allows for portability of any of the data stored therein to another host computer either locally or wherever the portable peripheral memory storage device 110 is taken.

Referring to FIG. 2, it is further known to secure data within the portable peripheral memory storage device of FIG. 1a and of FIG. 1b and to require user authentication in order to access same. In such a portable peripheral memory storage device, a user is prompted to provide user authentication data, either to the host computer or to the peripheral memory storage device itself in order to "unlock" the data stored within the peripheral memory storage device. For example, a peripheral memory storage device comprising a fingerprint scanner requires a user to provide a live fingerprint thereto before releasing data stored therein. As shown in FIG. 2, a memory space 20 includes a peripheral memory storage area 22 and a security data storage area 21. Data stored within the security data storage area is for securing the data stored within the peripheral memory storage area. For example, this area includes processes for execution by a controller within the portable peripheral memory storage device for securing and de-securing of data. Optionally, this area includes correlation data for being correlated with user provided security data or information.

The peripheral memory storage area 22 comprises static RAM and effectively appears as the mounted storage area within an operating system of the host system.

Referring to FIG. 3, it is further known to secure data within the portable peripheral memory storage device of FIG. 1a and of FIG. 1b and to require user authentication in order to access same. In such a portable peripheral memory storage device, a user is prompted to provide user authentication data, either to the host computer or to the peripheral memory storage device itself in order to "unlock" the data stored within the peripheral memory storage device. For example, a peripheral memory storage device comprising a fingerprint scanner requires a user to provide a live fingerprint thereto before releasing data stored therein. As shown in FIG. 3, a memory space 30 includes a peripheral memory storage area 32 and a security data storage area 31. Data stored within the security data storage area is for securing the data stored within the peripheral memory storage area. For example, this area includes processes for execution by a controller within the portable peripheral memory storage device for securing and de-securing of data. Optionally, this area includes correlation data for being correlated with user provided security data or information.

The peripheral memory storage area 32 comprises static RAM for having data relating to a personalized desktop stored therein for use with a host system in providing the user with portable desktop functionality. The data stored therein is modified and updated by the portable desktop application.

Generally speaking an embodiment of the present invention contemplates a system that enables personalized desktop functionality provided via a peripheral memory device while supporting other functions of the peripheral memory device.

Referring to FIG. 4, a memory diagram of an exemplary device is shown. In such a portable peripheral memory storage device, a user is prompted to provide user authentication data, either to the host computer or to the peripheral memory storage device itself in order to "unlock" the data stored within the peripheral memory storage device. For example, a peripheral memory storage device comprising a fingerprint scanner requires a user to provide a live fingerprint thereto before releasing data stored therein. As shown in FIG. 4, a memory space 40 includes peripheral memory storage areas 42a and 42b and a security data storage area 41. Data stored within the security data storage area is for securing the data stored within the peripheral memory storage area. For example, this area includes processes for execution by a controller within the portable peripheral memory storage device for securing and de-securing of data. Optionally, this area includes correlation data for being correlated with user provided security data or information.

The peripheral memory storage area 42a comprises static RAM for having data relating to a personalized desktop stored therein for use with a host system in providing the user with portable desktop functionality. The data stored therein is modified and updated by the portable desktop application. The peripheral memory storage area 42b comprises static RAM and effectively appears as the mounted storage area within an operating system of the host system.

Thus, the portable peripheral memory storage device optionally includes circuitry for executing functions thereof such as cache management, memory use optimization, security functions, and communication functions. The portable peripheral memory storage device is operable in either of two modes of operation. In a first mode of operation, the device supports portable desktop functionality. In a second other mode of operation the portable peripheral memory storage device supports external memory storage as a mounted storage device within a host system.

Alternatively as shown in FIG. 5, a memory space 50 includes peripheral memory storage areas 52a and 52b and security data storage areas 51a and 51b. Data stored within the security data storage areas is for securing data stored within an associated portion of the peripheral memory storage area. For example, each of the areas 51a and 51b includes processes for execution by a controller within the portable peripheral memory storage device for securing and de-securing of data. Optionally, each area includes correlation data for being correlated with user provided security data or information.

The peripheral memory storage area 52a comprises static RAM for having data relating to a personalized desktop stored therein for use with a host system in providing the user with portable desktop functionality. The data stored therein is modified and updated by the portable desktop application. Accessing of the portable desktop is via security based on data within the area 51a. The peripheral memory storage area 52b comprises static RAM and effectively appears as the mounted storage area within an operating system of the host system. Accessing of the mounted storage area is via security based on data within the area 51b.

Thus, the portable peripheral memory storage device optionally includes circuitry for executing functions thereof such as cache management, memory use optimization, security functions, and communication functions. The portable peripheral memory storage device is operable in either of two modes of operation. In a first mode of operation, the device supports portable desktop functionality. In a second other mode of operation the portable peripheral memory storage device supports external memory storage as a mounted storage device within a host system.

In FIG. 6 a simplified memory diagram for a portable peripheral memory storage device that is not secured is shown. A memory space 60 includes peripheral memory storage areas 62a and 62b. In applications of this nature, either the data and portable desktop security is not considered of concern or the physical security of the portable device is relied upon to secure the data.

The peripheral memory storage area 62a comprises static RAM for having data relating to a personalized desktop stored therein for use with a host system in providing the user with portable desktop functionality. The data stored therein is modified and updated by the portable desktop application. The peripheral memory storage area 62b comprises static RAM and effectively appears as the mounted storage area within an operating system of the host system.

Thus, the portable peripheral memory storage device optionally includes circuitry for executing functions thereof such as cache management, memory use optimization, security functions, and communication functions. The portable peripheral memory storage device is operable in either of two modes of operation. In a first mode of operation, the device supports portable desktop functionality. In a second other mode of operation the portable peripheral memory storage device supports external memory storage as a mounted storage device within a host system.

Referring to FIG. 7, shown is a simplified flow diagram of a method of providing a virtual desktop. At 701, a first user is provided with a peripheral memory storage device in the form of a universal serial bus (USB) memory key comprising memory storage therein for coupling to a USB port of a host computer system. The peripheral memory storage device has data stored therein for supporting the portable desktop of the first user, for example by having stored thereon the user's personal directory containing personal data/files including, for example, email, appointments, desktop files and the like. The peripheral memory storage device is preferably sufficiently small to enable users to clip it to their clothing or otherwise carry it on themselves in the same way that they might have a cellular telephone or a wireless paging device. Peripheral memory storage devices of this nature are well known and presently are offered in numerous small form factors many of which will fit in a change purse. Larger peripheral memory storage devices comprise hard drives, but even these are generally of a size and form factor for easy portability.

The portable peripheral storage device is coupled with a host computer during use thereof at 702. Typically, this is performed by inserting the USB connector of the portable peripheral memory storage device into a mating connector of the host computer. Alternatively, another method of coupling in the form of wireless coupling is used. Further alternatively, yet another coupling process is employed.

Because the host computer system is in use, at 704 a first partition of the portable peripheral memory storage device is mounted as an external removable storage device within an operating system of the host computer system. The first user is then able to, at 706, store and retrieve files within the partition. The first user, however, is barred from accessing any data within their portable desktop. Optionally, the portable desktop is completely hidden form the first user such that the device appears, for example, as a standard USB portable memory device.

Referring to FIG. 8, when the host computer is rebooted at 801, the portable peripheral memory device is detected at boot-up and at 802 causes the host computer to execute the personal desktop of the first user based on memory within a second partition of the portable peripheral memory storage device. The personal desktop denies the first user access to the first partition of the portable peripheral memory device.

Referring to FIG. 9, an alternative embodiment is shown. When the host computer is rebooted at 901, the portable peripheral memory device is detected at boot-up and at 902 causes the host computer to execute the personal desktop of the first user based on memory within a second partition of the portable peripheral memory storage device. At 903, the personal desktop mounts the first partition of the portable peripheral memory storage device as a storage device. Thus, the portable peripheral memory storage device is usable as a personal desktop device and as a portable storage device. At 906, the first user retrieves data from the first partition. The first user is prevented from storing data within the first partition thereby allowing importing of external data to the portable desktop while preventing exporting of internal data from the personal desktop.

Referring to FIG. 10, an alternative embodiment is shown. When the host computer is rebooted at 1001, the portable peripheral memory device is detected at boot-up and at 1002 causes the host computer to execute the personal desktop of the first user based on memory within a second partition of the portable peripheral memory storage device. At 1003, the personal desktop mounts the first partition of the portable peripheral memory storage device as a storage device. Thus, the portable peripheral memory storage device is usable as a personal desktop device and as a portable storage device. At 1005, the first user stores data within the first partition and at 1006 the first user retrieves data from the first partition.

Though the term partition is used hereinabove other methods of securing portions of a storage medium from access thereto are also supported. For example, instead of preventing access to the first partition, access is prevented to a portion of the memory device having files stored therein and accessible when the portable peripheral memory device is mounted as a removable memory device.

The term mounted is typically used to denote making a memory store accessible from within an operating system. When the portable peripheral memory storage device is used to implement a portable desktop, the portable desktop itself is a result of access to the device. As such, the term mounting of a memory store within the device is optionally a software function within the portable desktop environment.

Optionally, when the portable desktop device is coupled to a host computer, authentication of the first user is required before the portable desktop device is accessible for portable desktop execution.

Further optionally, when the portable desktop device is coupled to a host computer, authentication of the first user is required before the portable desktop device is accessible for use as a memory storage device. Alternatively, even after authentication has occurred, the portable desktop data within the portable desktop device is hidden form the user unless Further optionally, when the portable desktop device is coupled to a host computer, authentication of the first user is required before the portable desktop device is accessible for use as either a portable desktop device or as a memory storage device.

Numerous other embodiments may be envisaged without departing from the spirit or scope of the invention.

What is claimed is:

1. A portable peripheral memory storage device comprising:
   a housing;
   a port for interfacing with a workstation;
   a memory comprising at least a first portion and a second portion, the first portion comprising portable desktop data and for supporting portable desktop functionality on a workstation coupled thereto and the second portion for providing portable peripheral memory storage device functionality for a workstation coupled thereto via the port and independent of the portable desktop functionality; and,
   a processor for providing limited access to the second portion when the device is operating to provide a portable desktop, the limited access restricting access to the second portion relative to access to the second portion independent of the portable desktop functionality.

2. A peripheral memory storage device according to claim 1 wherein
   the port comprises a universal serial bus (USB) port.

3. A peripheral memory storage device according to claim 1 wherein
   the housing is sized and configured for fitting within the clothing of an individual.

4. A peripheral memory storage device according to claim 1 comprising
   a processor for preventing access to the first portion unless the device is operating to provide a portable desktop.

5. A peripheral memory storage device according to claim 4 wherein
   the processor hides the first portion unless the device is operating to provide a portable desktop.

6. A peripheral memory storage device according to claim 1 comprising
   a processor for providing access to the second portion when the device is operating to provide a portable desktop.

7. A peripheral memory storage device according to claim 1 comprising
   a processor for preventing access to the second portion when the device is operating to provide a portable desktop.

8. A peripheral memory storage device according to claim 1 comprising
   a processor for preventing access to both the first and second portions absent prior user authentication.

9. A portable peripheral memory storage device as in claim 1, wherein
   in said memory comprising at least a first portion and a second portion the first portion for supporting portable desktop functionality on a workstation coupled thereto, the first portion hidden unless the portable peripheral memory storage device is operable for providing the portable desktop functionality.

10. A peripheral memory storage device according to claim 1 wherein
    the device supports portable desktop functionality only when coupled during booting the workstation and provides portable peripheral memory storage device functionality when coupled to a workstation other than during booting thereof.

11. A peripheral memory storage device according to claim 10 wherein
    when the device is coupled to the workstation during booting, the workstation boots from the peripheral memory storage device, the workstation having non-volatile memory storage other than the peripheral memory storage device disabled.

12. A portable peripheral memory storage device comprising:
    a housing;
    a port for interfacing with a workstation;
    a memory comprising at least a first portion and a second portion, the first portion comprising portable desktop data and for supporting portable desktop functionality on a workstation coupled thereto and the second portion for providing portable peripheral memory storage device functionality for a workstation coupled thereto via the port and independent of the portable desktop functionality; and,
    a processor for providing access to the second portion when the device is operating to provide a portable desktop, the access to the second portion less restrictive relative to restricted access to the second portion from the portable desktop functionality.

13. A peripheral memory storage device according to claim 12 wherein
    the port comprises a universal serial bus (USB) port.

14. A peripheral memory storage device according to claim 12 wherein
    the housing is sized and configured for fitting within the clothing of an individual.

15. A peripheral memory storage device according to claim 12 comprising
    a processor for preventing access to the first portion unless the device is operating to provide a portable desktop.

16. A peripheral memory storage device according to claim 15 wherein
    the processor hides the first portion unless the device is operating to provide a portable desktop.

17. A peripheral memory storage device according to claim 12 comprising a processor for providing access to the second portion when the device is operating to provide a portable desktop.

18. A peripheral memory storage device according to claim 12 comprising
a processor for preventing access to the second portion when the device is operating to provide a portable desktop.

19. A peripheral memory storage device according to claim 12 comprising
a processor for preventing access to both the first and second portions absent prior user authentication.

20. A portable peripheral memory storage device as in claim 12, wherein
in said memory comprising at least a first portion and a second portion, the first portion for supporting portable desktop functionality on a workstation coupled thereto, the first portion hidden unless the portable peripheral memory storage device is operable for providing the portable desktop functionality.

21. A peripheral memory storage device according to claim 12 wherein
the device supports portable desktop functionality only when coupled during booting the workstation and provides portable peripheral memory storage device functionality when coupled to a workstation other than during booting thereof.

22. A peripheral memory storage device according to claim 21 wherein
when the device is coupled to the workstation during booting, the workstation boots from the peripheral memory storage device, the workstation having non-volatile memory storage other than the peripheral memory storage device disabled.

23. A method comprising:
coupling a peripheral memory storage device with a workstation;
in a first mode of operation, mounting a portion of the peripheral memory storage device on the workstation for operation therewith in a first mode of operation as a storage medium;
in a second other mode of operation using data within the peripheral memory storage device to support a personal desktop on the workstation;
wherein in the second mode of operation, the portion of the peripheral memory storage device is accessible via the portable desktop as a storage medium mounted thereto, and wherein in the second mode of operation, the portion of the peripheral memory storage device is read only.

24. A method according to claim 23 wherein
in the first mode of operation, the portion of the peripheral memory storage device is write only.

25. A method according to claim 23 wherein the data within
the peripheral memory storage device to support a personal desktop is stored within a separate partition of the peripheral memory storage device.

26. A method according to claim 23 wherein
the device operates within the second mode of operation when installed prior to booting the host computer and in the first mode of operation when installed within a host computer that is already booted.

27. A method according to claim 26 wherein
when installed prior to booting the host computer the host computer boots from the peripheral memory storage device, the host computer having non-volatile memory storage other than the peripheral memory storage device disabled.

28. A method according to claim 23 comprising:
providing user authentication data to the peripheral memory storage device;
when the user authentication data is indicative of other than an authorized user, denying access to data stored within the peripheral memory storage device; and,
when the user authentication data is indicative of an authorized user, providing access to data stored within the peripheral memory storage device.

29. A method comprising:
coupling a peripheral memory storage device with a workstation;
in a first mode of operation, mounting a portion of the peripheral memory storage device on the workstation for operation therewith in a first mode of operation as a storage medium;
in a second other mode of operation using data within the peripheral memory storage device to support a personal desktop on the workstation;
wherein the data within the peripheral memory storage device to support a personal desktop is inaccessible in the first mode of operation.

30. A method according to claim 29 wherein
the portion of the peripheral memory storage device is inaccessible in the second mode of operation.

31. A method according to claim 29 wherein the data within
the peripheral memory storage device to support a personal desktop is stored within a separate partition of the peripheral memory storage device.

32. A method according to claim 29 wherein
the device operates within the second mode of operation when installed prior to booting the host computer and in the first mode of operation when installed within a host computer that is already booted.

33. A method according to claim 32 wherein
when installed prior to booting the host computer the host computer boots from the peripheral memory storage device, the host computer having non-volatile memory storage other than the peripheral memory storage device disabled.

34. A method according to claim 29 comprising:
providing user authentication data to the peripheral memory storage device;
when the user authentication data is indicative of other than an authorized user, denying access to data stored within the peripheral memory storage device; and,
when the user authentication data is indicative of an authorized user, providing access to data stored within the peripheral memory storage device.

35. A non-transitory peripheral memory storage device including instructions directing a processor to perform a method, said method comprising:
coupling said peripheral memory storage device with a workstation;
in a first mode of operation, mounting a portion of the peripheral memory storage device on the workstation for operation therewith in a first mode of operation as a storage medium;
in a second other mode of operation using data within the peripheral memory storage device to support a personal desktop on the workstation;
wherein in the second mode of operation, the portion of the peripheral memory storage device is accessible via the portable desktop as a storage medium mounted thereto, and wherein in the second mode of operation, the portion of the peripheral memory storage device is read only.

36. A non-transitory peripheral memory storage device according to claim 35 wherein
in the first mode of operation, the portion of the peripheral memory storage device is write only.

37. A non-transitory peripheral memory storage device according to claim 35 wherein the data within
the peripheral memory storage device to support a personal desktop is stored within a separate partition of the peripheral memory storage device.

38. A non-transitory peripheral memory storage device according to claim 35 wherein
the device operates within the second mode of operation when installed prior to booting the host computer and in the first mode of operation when installed within a host computer that is already booted.

39. A non-transitory peripheral memory storage device according to claim 35 wherein
when installed prior to booting the host computer the host computer boots from the peripheral memory storage device, the host computer having non-volatile memory storage other than the peripheral memory storage device disabled.

40. A non-transitory peripheral memory storage device according to claim 35 comprising:
providing user authentication data to the peripheral memory storage device;
when the user authentication data is indicative of other than an authorized user, denying access to data stored within the peripheral memory storage device; and,
when the user authentication data is indicative of an authorized user, providing access to data stored within the peripheral memory storage device.

41. A non-transitory peripheral memory storage device including instructions directing a processor to perform a method, said method comprising:
coupling said peripheral memory storage device with a workstation;
in a first mode of operation, mounting a portion of the peripheral memory storage device on the workstation for operation therewith in a first mode of operation as a storage medium;
in a second other mode of operation using data within the peripheral memory storage device to support a personal desktop on the workstation;
wherein the data within the peripheral memory storage device to support a personal desktop is inaccessible in the first mode of operation.

42. A non-transitory peripheral memory storage device according to claim 41 wherein
the portion of the peripheral memory storage device is inaccessible in the second mode of operation.

43. A non-transitory peripheral memory storage device according to claim 41 wherein
in the first mode of operation, the portion of the peripheral memory storage device is write only.

44. A non-transitory peripheral memory storage device according to claim 41 wherein the data within
the peripheral memory storage device to support a personal desktop is stored within a separate partition of the peripheral memory storage device.

45. A non-transitory peripheral memory storage device according to claim 41 wherein
the device operates within the second mode of operation when installed prior to booting the host computer and in the first mode of operation when installed within a host computer that is already booted.

46. A non-transitory peripheral memory storage device according to claim 41 wherein
when installed prior to booting the host computer the host computer boots from the peripheral memory storage device, the host computer having non-volatile memory storage other than the peripheral memory storage device disabled.

47. A non-transitory peripheral memory storage device according to claim 41 comprising:
providing user authentication data to the peripheral memory storage device;
when the user authentication data is indicative of other than an authorized user, denying access to data stored within the peripheral memory storage device; and,
when the user authentication data is indicative of an authorized user, providing access to data stored within the peripheral memory storage device.

* * * * *